United States Patent
Agarwal et al.

(10) Patent No.: US 10,437,616 B2
(45) Date of Patent: Oct. 8, 2019

(54) METHOD, APPARATUS, SYSTEM FOR OPTIMIZED WORK SUBMISSION TO AN ACCELERATOR WORK QUEUE

(71) Applicant: Intel Corporation, Santa Clara, CA (US)

(72) Inventors: Ishwar Agarwal, Hillsboro, OR (US); Rajesh Sankaran, Portland, OR (US); Stephen Van Doren, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 51 days.

(21) Appl. No.: 15/396,529

(22) Filed: Dec. 31, 2016

(65) Prior Publication Data

US 2018/0189104 A1     Jul. 5, 2018

(51) Int. Cl.
*G06F 9/455* (2018.01)
*G06F 9/50* (2006.01)

(52) U.S. Cl.
CPC .............. *G06F 9/455* (2013.01); *G06F 9/505* (2013.01)

(58) Field of Classification Search
CPC .............................................. G06F 9/50–5083
USPC ........................................................ 718/104
See application file for complete search history.

(56) References Cited

U.S. PATENT DOCUMENTS

| | | | | |
|---|---|---|---|---|
| 6,029,205 A * | 2/2000 | Alferness | ............... | G06F 9/546 718/103 |
| 6,088,771 A | 7/2000 | Steely, Jr. et al. | | |
| 6,128,642 A * | 10/2000 | Doraswamy | ............ | G06F 9/505 709/201 |
| 6,950,945 B2 * | 9/2005 | Pfister | ..................... | G06F 9/526 718/104 |
| 6,993,602 B2 * | 1/2006 | Merrill | .................. | G06F 3/0607 709/209 |
| 7,046,676 B2 * | 5/2006 | Goetzinger | ........... | H04L 47/521 370/395.4 |
| 7,107,413 B2 * | 9/2006 | Rosenbluth | ......... | G06F 9/30003 370/412 |
| 7,176,914 B2 * | 2/2007 | Emmot | ..................... | G06T 1/20 345/418 |
| 7,251,815 B2 * | 7/2007 | Donovan | ................ | G06F 9/485 718/1 |
| 7,546,386 B2 * | 6/2009 | Arndt | .................... | G06F 13/385 710/10 |

(Continued)

OTHER PUBLICATIONS

"A Work-Efficient Algorithm for Parallel Unordered Depth-First Search"; Umut A. Acar, Arthur Charguéraud, Mike Rainey; SC '15, Nov. 15-20, 2015, Austin, TX, USA.*

(Continued)

*Primary Examiner* — Francisco J Aponte
(74) *Attorney, Agent, or Firm* — Alliance IP, LLC

(57) ABSTRACT

Aspects of the embodiments are directed to systems and methods performed by a virtual shared work queue (VSWQ). The VSWQ can receive an enqueue command (ENQCMD/S) destined for a shared work queue of a peripheral device. The VSWQ can determine a value of a credit counter for the shared work queue, wherein a credit of the credit counter represents an availability of the shared work queue to accept the enqueue command. The VSWQ can respond to the enqueue command based on the value of the credit counter.

16 Claims, 9 Drawing Sheets

(56) References Cited

U.S. PATENT DOCUMENTS

| | | | |
|---|---|---|---|
| 7,555,002 B2* | 6/2009 | Arndt | H04L 67/1097 370/412 |
| 7,895,431 B2* | 2/2011 | Bouchard | H04L 12/56 370/395.4 |
| 7,933,947 B2* | 4/2011 | Fleischer | G06F 9/5033 709/201 |
| 7,945,677 B2* | 5/2011 | Fleischer | H04L 67/40 709/203 |
| 8,213,322 B2 | 7/2012 | Jones et al. | |
| 8,505,013 B2* | 8/2013 | Pollock | G06F 9/32 711/5 |
| 8,707,323 B2* | 4/2014 | Galchev | G06F 9/505 718/105 |
| 8,868,810 B2* | 10/2014 | Gomes | G06F 13/24 710/260 |
| 8,935,483 B2* | 1/2015 | Pirog | G06F 9/3851 711/141 |
| 9,128,771 B1* | 9/2015 | Garg | G06F 9/5005 |
| 2002/0146022 A1 | 10/2002 | Doren et al. | |
| 2003/0005025 A1* | 1/2003 | Shavit | G06F 9/4843 718/102 |
| 2004/0024894 A1* | 2/2004 | Osman | H04L 69/16 709/230 |
| 2004/0037302 A1* | 2/2004 | Varma | H04L 49/90 370/412 |
| 2004/0221285 A1 | 11/2004 | Donovan et al. | |
| 2004/0255305 A1 | 12/2004 | Doren et al. | |
| 2004/0260748 A1* | 12/2004 | Springer, Sr. | G06F 9/505 709/200 |
| 2004/0260773 A1 | 12/2004 | Springer | |
| 2006/0067347 A1* | 3/2006 | Naik | H04L 47/6255 370/412 |
| 2006/0227811 A1* | 10/2006 | Hussain | H04L 49/90 370/503 |
| 2006/0277126 A1* | 12/2006 | Rosenbluth | G06F 9/5016 705/35 |
| 2007/0195761 A1* | 8/2007 | Tatar | H04L 49/1546 370/389 |
| 2008/0008202 A1* | 1/2008 | Terrell | H04L 45/00 370/401 |
| 2009/0234908 A1* | 9/2009 | Reyhner | G06F 9/546 709/203 |
| 2011/0078700 A1* | 3/2011 | Blackburn | G06F 9/505 718/105 |
| 2011/0161955 A1* | 6/2011 | Woller | G06F 9/4406 718/1 |
| 2014/0089444 A1* | 3/2014 | Makhervaks | G06F 15/17331 709/212 |
| 2014/0280716 A1* | 9/2014 | Arramreddy | H04L 49/90 709/217 |
| 2014/0281243 A1* | 9/2014 | Shalf | G06F 12/0813 711/122 |
| 2014/0310467 A1* | 10/2014 | Shalf | G06F 15/7825 711/119 |
| 2016/0112292 A1* | 4/2016 | Ahuja | H04L 67/1097 709/212 |
| 2016/0127267 A1* | 5/2016 | Kumar | H04L 49/252 370/400 |
| 2016/0154677 A1* | 6/2016 | Barik | G06F 13/4239 718/105 |
| 2016/0226797 A1* | 8/2016 | Aravinthan | H04L 49/3027 |
| 2017/0060606 A1* | 3/2017 | Hollinger | G06F 9/45508 |
| 2017/0060607 A1* | 3/2017 | Hollinger | G06F 9/45508 |
| 2017/0115924 A1* | 4/2017 | Abali | G06F 13/362 |
| 2018/0095750 A1* | 4/2018 | Drysdale | G06F 9/50 |

OTHER PUBLICATIONS

"CASPAR: Breaking Serialization in Lock-Free Multicore Synchronization"; Tanmay Gangwani, Adam Morrison, Josep Torrellas; ASPLOS '16, Apr. 2-6, 2016, Atlanta, Georgia, USA.*

"Accelerating Synchronization Using Moving Compute to Data Model at 1,000-core Multicore Scale"; Halit Dogan, Masab Ah Mad, Brian Kahne and Omer Khan; ACM Transactions on Architecture and Code Optimization, vol. 16, No. 1, Article 4. Publication date: Feb. 2019.*

Extended European Search Report for EP Application No. 17206406.5 dated May 3, 2018, 7 pages.

* cited by examiner

METHOD, APPARATUS, SYSTEM FOR OPTIMIZED WORK SUBMISSION TO AN ACCELERATOR WORK QUEUE

FIELD

This disclosure pertains to computing system, and in particular (but not exclusively) to optimized work submission to an accelerator work queue.

BACKGROUND

Work submissions to high performance I/O devices or accelerators can be scaled by a common command interface, also known as a Shared Work Queue (SWQ), in the device, which could be addressed by any number of ring-3 or ring-0 software clients through a set of new CPU instructions.

These new instructions, called ENQCMD & ENQCMDS, addresses the SWQ using a MMIO address, which in turn produces an atomic non-posted write transaction towards the device. This transaction carries with it a descriptor and associated information about the work that the client is attempting to submit to the device. When this transaction arrives at the SWQ, the device then makes a decision on whether it can successfully enqueue the work or not depending on a number of device/client/SWQ specific conditions. The binary result of this decision, success or retry, is then communicated back to the CPU and finally, to the issuing instruction in the form of an architecturally visible flag. This architecture allows an infinite number of clients to submit work to a finite SWQ, allowing for scalability in sharing of I/O device/accelerator across VMs & containers.

DETAILED DESCRIPTION

Figure 1:
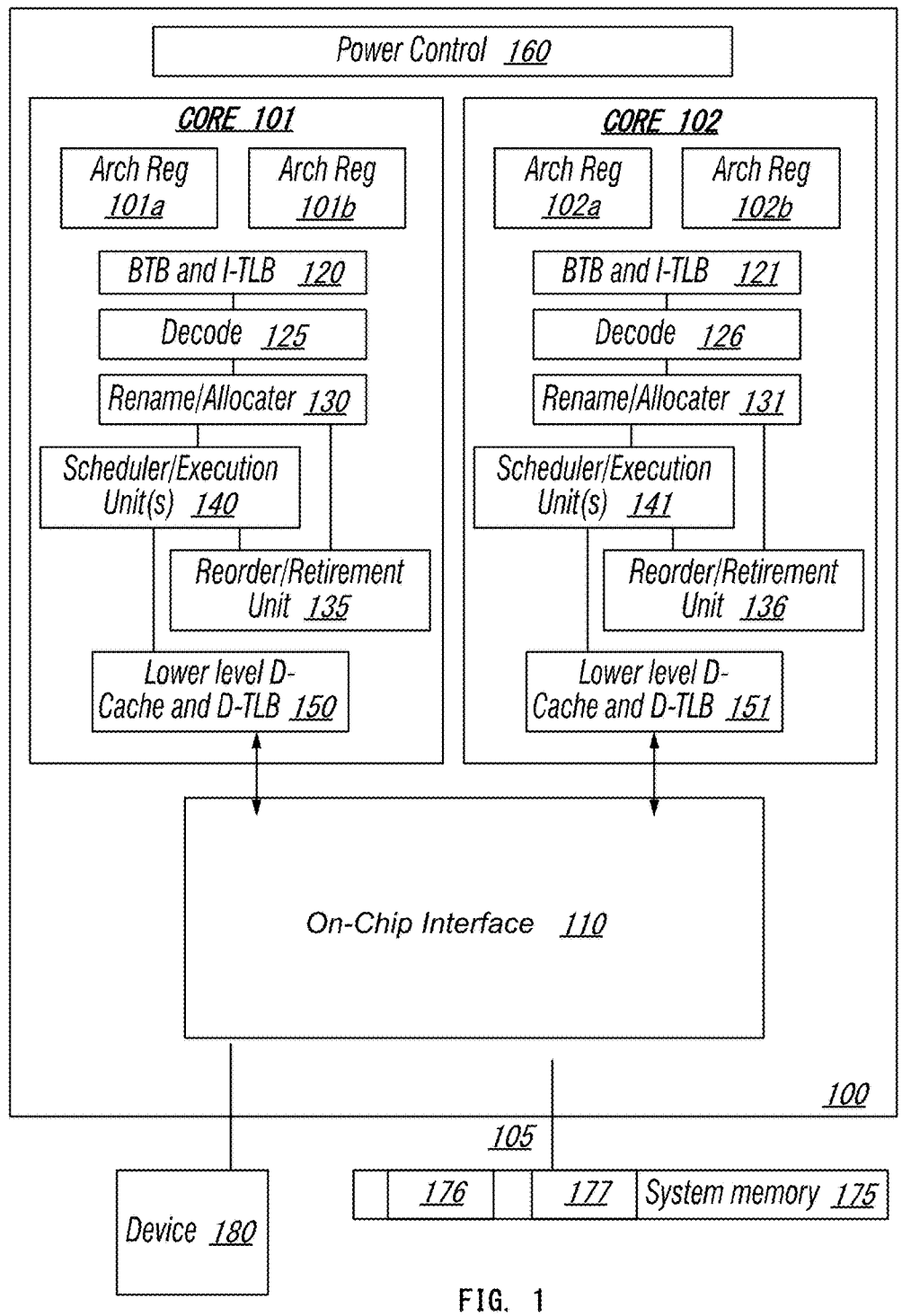
FIG. 1 illustrates an embodiment of a block diagram for a computing system including a multicore processor.

In the following description, numerous specific details are set forth, such as examples of specific types of processors and system configurations, specific hardware structures, specific architectural and micro architectural details, specific register configurations, specific instruction types, specific system components, specific measurements/heights, specific processor pipeline stages and operation etc. in order to provide a thorough understanding of the present disclosure. It will be apparent, however, to one skilled in the art that these specific details need not be employed to practice the present disclosure. In other instances, well known components or methods, such as specific and alternative processor architectures, specific logic circuits/code for described algorithms, specific firmware code, specific interconnect operation, specific logic configurations, specific manufacturing techniques and materials, specific compiler implementations, specific expression of algorithms in code, specific power down and gating techniques/logic and other specific operational details of computer system haven't been described in detail in order to avoid unnecessarily obscuring the present disclosure.

Although the following embodiments may be described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop computer systems or Ultrabooks™. And may be also used in other devices, such as handheld devices, tablets, other thin notebooks, systems on a chip (SOC) devices, and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future balanced with performance considerations.

As computing systems are advancing, the components therein are becoming more complex. As a result, the interconnect architecture to couple and communicate between the components is also increasing in complexity to ensure bandwidth requirements are met for optimal component operation. Furthermore, different market segments demand different aspects of interconnect architectures to suit the market's needs. For example, servers require higher performance, while the mobile ecosystem is sometimes able to sacrifice overall performance for power savings. Yet, it's a singular purpose of most fabrics to provide highest possible performance with maximum power saving. Below, a number of interconnects are discussed, which would potentially benefit from aspects of the disclosure described herein.

Referring to FIG. 1, an embodiment of a block diagram for a computing system including a multicore processor is depicted. Processor 100 includes any processor or processing device, such as a microprocessor, an embedded processor, a digital signal processor (DSP), a network processor, a handheld processor, an application processor, a co-processor, a system on a chip (SOC), or other device to execute code. Processor 100, in one embodiment, includes at least two cores—core 101 and 102, which may include asymmetric cores or symmetric cores (the illustrated embodiment). However, processor 100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 100, as illustrated in FIG. 1, includes two cores—core 101 and 102. Here, core 101 and 102 are considered symmetric cores, i.e. cores with the same configurations, functional units, and/or logic. In another embodiment, core 101 includes an out-of-order processor core, while core 102 includes an in-order processor core. However, cores 101 and 102 may be individually selected from any type of core, such as a native core, a software managed core, a core adapted to execute a native Instruction Set Architecture (ISA), a core adapted to execute a translated Instruction Set Architecture (ISA), a co-designed core, or other known core. In a heterogeneous core environment (i.e. asymmetric cores), some form of translation, such a binary translation, may be utilized to schedule or execute code on one or both cores. Yet to further the discussion, the functional units illustrated in core 101 are described in further detail below, as the units in core 102 operate in a similar manner in the depicted embodiment.

As depicted, core 101 includes two hardware threads 101*a* and 101*b*, which may also be referred to as hardware thread slots 101*a* and 101*b*. Therefore, software entities, such as an operating system, in one embodiment potentially view processor 100 as four separate processors, i.e., four logical processors or processing elements capable of executing four software threads concurrently. As alluded to above, a first thread is associated with architecture state registers 101*a*, a second thread is associated with architecture state registers 101*b*, a third thread may be associated with architecture state registers 102*a*, and a fourth thread may be associated with architecture state registers 102*b*. Here, each of the architecture state registers (101*a*, 101*b*, 102*a*, and 102*b*) may be referred to as processing elements, thread slots, or thread units, as described above. As illustrated, architecture state registers 101*a* are replicated in architecture state registers 101*b*, so individual architecture states/contexts are capable of being stored for logical processor 101*a* and logical processor 101*b*. In core 101, other smaller resources, such as instruction pointers and renaming logic in allocator and renamer block 130 may also be replicated for threads 101*a* and 101*b*. Some resources, such as re-order buffers in reorder/retirement unit 135, ILTB 120, load/store buffers, and queues may be shared through partitioning. Other resources, such as general purpose internal registers, page-table base register(s), low-level data-cache and data-TLB 115, execution unit(s) 140, and portions of out-of-order unit 135 are potentially fully shared.

Processor 100 often includes other resources, which may be fully shared, shared through partitioning, or dedicated by/to processing elements. In FIG. 1, an embodiment of a purely exemplary processor with illustrative logical units/resources of a processor is illustrated. Note that a processor may include, or omit, any of these functional units, as well as include any other known functional units, logic, or firmware not depicted. As illustrated, core 101 includes a simplified, representative out-of-order (OOO) processor core. But an in-order processor may be utilized in different embodiments. The OOO core includes a branch target buffer 120 to predict branches to be executed/taken and an instruction-translation buffer (I-TLB) 120 to store address translation entries for instructions.

Core 101 further includes decode module 125 coupled to fetch unit 120 to decode fetched elements. Fetch logic, in one embodiment, includes individual sequencers associated with thread slots 101*a*, 101*b*, respectively. Usually core 101 is associated with a first ISA, which defines/specifies instructions executable on processor 100. Often machine code instructions that are part of the first ISA include a portion of the instruction (referred to as an opcode), which references/specifies an instruction or operation to be performed. Decode logic 125 includes circuitry that recognizes these instructions from their opcodes and passes the decoded instructions on in the pipeline for processing as defined by the first ISA. For example, as discussed in more detail below decoders 125, in one embodiment, include logic designed or adapted to recognize specific instructions, such as transactional instruction. As a result of the recognition by decoders 125, the architecture or core 101 takes specific, predefined actions to perform tasks associated with the appropriate instruction. It is important to note that any of the tasks, blocks, operations, and methods described herein may be performed in response to a single or multiple instructions; some of which may be new or old instructions. Note decoders 126, in one embodiment, recognize the same ISA (or a subset thereof). Alternatively, in a heterogeneous core environment, decoders 126 recognize a second ISA (either a subset of the first ISA or a distinct ISA).

In one example, allocator and renamer block 130 includes an allocator to reserve resources, such as register files to store instruction processing results. However, threads 101*a* and 101*b* are potentially capable of out-of-order execution, where allocator and renamer block 130 also reserves other resources, such as reorder buffers to track instruction results. Unit 130 may also include a register renamer to rename program/instruction reference registers to other registers internal to processor 100. Reorder/retirement unit 135 includes components, such as the reorder buffers mentioned above, load buffers, and store buffers, to support out-of-order execution and later in-order retirement of instructions executed out-of-order.

Scheduler and execution unit(s) block 140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 150 are coupled to execution unit(s) 140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 101 and 102 share access to higher-level or further-out cache, such as a second level cache associated with on-chip interface 110. Note that higher-level or further-out refers to cache levels increasing or getting further way from the execution unit(s). In one embodiment, higher-level cache is a last-level data cache—last cache in the memory hierarchy on processor 100—such as a second or third level data cache. However, higher level cache is not so limited, as it may be associated with or include an instruction cache. A trace cache—a type of instruction cache—instead may be coupled after decoder 125 to store recently decoded traces. Here, an instruction potentially refers to a macro-instruction (i.e. a general instruction recognized by the decoders), which may decode into a number of micro-instructions (micro-operations).

In the depicted configuration, processor 100 also includes on-chip interface module 110. Historically, a memory controller, which is described in more detail below, has been included in a computing system external to processor 100. In this scenario, on-chip interface 11 is to communicate with devices external to processor 100, such as system memory 175, a chipset (often including a memory controller hub to connect to memory 175 and an I/O controller hub to connect peripheral devices), a memory controller hub, a northbridge, or other integrated circuit. And in this scenario, bus 105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 175 may be dedicated to processor 100 or shared with other devices in a system. Common examples of types of memory 175 include DRAM, SRAM, non-volatile memory (NV memory), and other known storage devices. Note that device 180 may include a graphic accelerator, processor or card coupled to a memory controller hub, data storage coupled to an I/O controller hub, a wireless transceiver, a flash device, an audio controller, a network controller, or other known device.

Recently however, as more logic and devices are being integrated on a single die, such as SOC, each of these devices may be incorporated on processor 100. For example in one embodiment, a memory controller hub is on the same package and/or die with processor 100. Here, a portion of the core (an on-core portion) 110 includes one or more controller(s) for interfacing with other devices such as memory 175 or a graphics device 180. The configuration including an interconnect and controllers for interfacing with such devices is often referred to as an on-core (or un-core configuration). As an example, on-chip interface 110 includes a ring interconnect for on-chip communication and a high-speed serial point-to-point link 105 for off-chip communication. Yet, in the SOC environment, even more devices, such as the network interface, co-processors, memory 175, graphics processor 180, and any other known computer devices/interface may be integrated on a single die or integrated circuit to provide small form factor with high functionality and low power consumption.

In one embodiment, processor 100 is capable of executing a compiler, optimization, and/or translator code 177 to compile, translate, and/or optimize application code 176 to support the apparatus and methods described herein or to interface therewith. A compiler often includes a program or set of programs to translate source text/code into target text/code. Usually, compilation of program/application code with a compiler is done in multiple phases and passes to transform hi-level programming language code into low-level machine or assembly language code. Yet, single pass compilers may still be utilized for simple compilation. A compiler may utilize any known compilation techniques and perform any known compiler operations, such as lexical analysis, preprocessing, parsing, semantic analysis, code generation, code transformation, and code optimization.

Larger compilers often include multiple phases, but most often these phases are included within two general phases: (1) a front-end, i.e. generally where syntactic processing, semantic processing, and some transformation/optimization may take place, and (2) a back-end, i.e. generally where analysis, transformations, optimizations, and code generation takes place. Some compilers refer to a middle, which illustrates the blurring of delineation between a front-end and back end of a compiler. As a result, reference to insertion, association, generation, or other operation of a compiler may take place in any of the aforementioned phases or passes, as well as any other known phases or passes of a compiler. As an illustrative example, a compiler potentially inserts operations, calls, functions, etc. in one or more phases of compilation, such as insertion of calls/operations in a front-end phase of compilation and then transformation of the calls/operations into lower-level code during a transformation phase. Note that during dynamic compilation, compiler code or dynamic optimization code may insert such operations/calls, as well as optimize the code for execution during runtime. As a specific illustrative example, binary code (already compiled code) may be dynamically optimized during runtime. Here, the program code may include the dynamic optimization code, the binary code, or a combination thereof.

Similar to a compiler, a translator, such as a binary translator, translates code either statically or dynamically to optimize and/or translate code. Therefore, reference to execution of code, application code, program code, or other software environment may refer to: (1) execution of a compiler program(s), optimization code optimizer, or translator either dynamically or statically, to compile program code, to maintain software structures, to perform other operations, to optimize code, or to translate code; (2) execution of main program code including operations/calls, such as application code that has been optimized/compiled; (3) execution of other program code, such as libraries, associated with the main program code to maintain software structures, to perform other software related operations, or to optimize code; or (4) a combination thereof.

Modern and emerging accelerator devices and high-performance I/O devices support servicing requests "directly" from multiple "clients." "Clients" in this context could be multiple user-mode (ring-3) applications that are submitting direct user-mode i/o requests to the device, multiple kernel-mode (ring-0) drivers running in multiple virtual machines (VMs) sharing the same device, multiple software agents running in multiple containers (with OSs supporting container technologies), any combination of above (ring-3 applications inside a VM, Containers hardened by running them in a VM, etc.), peer I/O agents submitting work directly (without bouncing through host) for efficient inline acceleration (e.g., a NIC device using a Crypto device for encryption acceleration, or a touch controller or image processing unit using the GPU for advanced sensor processing), or a host software chaining offload requests across accelerators, where an accelerator device may forward work to another host software specified accelerator to chain work without bouncing through host (e.g., a compression accelerator compressing first, before chaining work to a bulk-crypto accelerator for encryption on the compressed data).

The term "directly" above implies the device is shared with multiple "clients" without any intermediate software layers (like a common kernel driver in case of user applications, or common VMM/hypervisor layer in case of virtual machines) in the control and data path, to minimize software overheads.

Examples of such multi-client accelerator/high-performance devices in Intel product roadmap and industry include programmable GPUs and GPGPUs for graphics and compute, configurable offload devices (DSPs) for image/audio/vision/sensor processing, reconfigurable offload devices such as FPGAs, fixed-function offload devices such as compression, crypto, regex, neural network and data analytics accelerator devices for speech/vision, machine learning, etc., high-performance host fabric controller devices such as RDMA-over-Ethernet, InfiniBand, Stormlake (OmniPath), etc., high-performance I/O devices like 10/40/100G Ethernet NICs, NVM-Express storage controllers devices, etc.

The common challenge across all these "direct" usages is to scale the usage across a large number of 'clients'. Such scalability impacts three areas:

1. Work-submission scalability: How to scale work submission interface ("command interface") to allow multiple clients to directly submit work to the shared physical device?

2. Address-space scalability: Since each of these clients are operating in its own view of memory (address space—be it CPU virtual, I/O virtual, guest physical, or host physical), how to identify memory accesses on behalf of each client's work request, and operate in the common address space of each client to access shared state in memory?

3. Synchronization/Completion scalability: How to synchronize/signal work completion or any kind of notification between the device and the respective clients, so that such synchronization/notification is delivered with the least overhead to the 'client'?

The architecture can include the following components:

1. The I/O device (referred to as accelerator devices in this disclosure) supports a common command interface for work submission from all of its clients. This common command interface is referred to herein as a "Shared Work Queue" (SWQ).

2. The shared work queue (SWQ) can be a shallow command queue implemented on the device. The depth of the command queue is device implementation specific, and can be sized based on the number of outstanding commands required to feed the device to achieve its full throughput potential. The SWQ can be implemented on the device in multiple ways.

3. The SWQ is accessible to queue work to it by external agents (host CPUs or peer devices) through a SWQ Portal Register (SWQ_PREG) in the MMIO space of the device. In one example implementation, the SWQ_PREG is a 64-byte sized/aligned register in MMIO space of device, but other choices may also be possible. If the device supports Single Root I/O virtualization (SR-IOV), the device may share an SWQ across Physical Function (PF) and multiple virtual functions (VFs). In this case, the SWQ would have a SWQ_PREG in the MMIO space of each respective PF and VF, all accessing the same SWQ behind it.

4. In some implementations, a device may implement more than one (but a small number) of SWQs. For example, the device may do so by implementing one SWQ for all supervisor (kernel-mode) client requests, while using a different SWQ for all user-mode client requests. Alternatively, it may support a SWQ for all (ring-0 and ring-3) host clients, and use separate SWQs for any peer device work submission for in-lining usages.

5. Software Clients (ring-3 or ring-0 software running on the host CPUs) submit work (commands) to a device SWQ through a set of new CPU instructions:

a. ENQCMD (Enqueue Command)—Can be executed from user (non ring-0) or supervisor (ring-0) privilege levels;

b. ENQCMDS (Enqueue Command as Supervisor)—Can be executed from only supervisor (ring-0) privilege level.

These CPU instructions are "general purpose" in the sense that, the CPU instructions can be used to enqueue work to SWQ(s) of any devices agnostic/transparent to the type of device to which the command is targeted.

6. The CPU instruction description is defined as below in one implementation.

ENQCMD/S r34/64, m512:

enqueue 64-byte command as a non-posted write to destination SWQ address (MMIO address), memory to memory move; operand encoded as one memory, one register; source specified as normal memory operand; destination specified as explicitly register.

ENQCMD executable from ring-3 or ring-0; ENQCMDS executable from ring-0

7. ENQCMD/S behavior:

Read command from memory, format and issue non-posted write, return status in EFLAGS.ZF; non-posted write ignores destination memory type and guarantees 64B write authenticity.

ENQCMD/S status encoding in EFLAGS.ZF encoding:

0: success (request queued to specified SWQ)

1: reject (request not accepted due to capacity/QoS reasons)

These CPU instructions produce an atomic non-posted write transaction (a write transaction for which a completion response is returned back to the CPU). The non-posted write transaction is address routed like any normal MMIO write to the target device. The non-posted write transaction carries with it the following information:

a. Identity of the address space of the client that executed this instruction. For this disclosure, the "Process Address Space Identifier" (PASID) can be the client address-space identity. Depending on the software usage, PASID can be used for any of the type of clients (process, container, VM, etc.). It is possible for other implementation of this disclosure to use different identification schemes. ENQCMD instruction use the PASID associated with the current software thread (something the OS is expected to save/restore using XSAVES/XRSTORS instructions on thread context switches). ENQCMDS instruction allows the privileged software executing this instruction to specify the PASID as part of the source operand for ENQCMDS instruction.

b. Privilege (supervisor or user) of the client that executed this instruction. Execution of ENQCMD always indicates user permission. ENQCMDS allows supervisor-mode software executing it to specify either user privilege (if it is executing it on behalf of some ring-3 client), or supervisor privilege (to indicate the command is from kernel mode client) as part of the source operand for ENQCMDS instruction.

c. Command Payload that is specific to the target device. The command payload is read from the source operand and conveyed as is by the instruction in the ENQCMD/S in different way. For example, some devices may treat it as a doorbell command where the payload specifies the actual work descriptor in memory to fetch from). Other devices may use the actual ENQCMD/S command to carry the device specific work descriptor, thus avoiding the latency/overhead for reading the work descriptors from main memory.

The SWQ on a device processes a non-posted write request received as follows:

At the ingress of device SWQ check if there is space in the SWQ to accept the request. If there is no space, drop the request and return a completion indicating "Reject/Retry" in completion status.

If there is space to accept command to the SWQ, perform any needed device specific admission control based on the attributes in the request (such as PASID, Privilege, or SWQ_PREG address to which the request is routed) and various device-specific QoS settings for specific clients. If the admission control method determines that the request cannot be accepted to the SWQ, the request is dropped and a completion is returned with a completion status of "Reject/Retry."

If the above checks result in the non-posted write command to be accepted to the SWQ, a completion is returned with completion status of "Successful Completion". The command queued to the SWQ is processed/dispatched based on the device-specific scheduling model internal to the device.

When the work specified by the command is completed, the device generates appropriate synchronization or notification transactions to inform the client about work completions. These could be through memory writes, interrupt writes, or other methods.

8. The ENQCMD and ENQCMDS instruction blocks until the completion response is received back by the CPU. The instruction returns the status (success v/s reject/retry) in the EFLAGS.ZF flag before the instruction retires.

9. Software may queue work through SWQ as follows:
a. Map the SWQ_PREG of the device to client's CPU virtual address space (user or kernel virtual address, depending of if the client is user-mode or runs in kernel-mode). This is similar to memory-mapping any MMIO resources on a device.
b. Format descriptor in memory
c. Execute ENQCMD/S with the memory virtual address of descriptor as source and the virtual address to which the SWQ_PREG is mapped as the destination.
d. Execute a condition jump (JZ) to check if the ENQCMD/S instruction returned success or retry. If retry status, either retry from step-C (with appropriate back-off).

10. A device may support a combination of existing work submission method and the shared work queue method to cater to specific usages.

In more general terms, an ENQCMD/S non-posted write may be dropped by any agent (core, coherent fabric, I/O fabric, bridges, . . . ) between the CPU and the device. If any agent drops an ENQCMD/S request, such agent must return a completion response with retry status code. Software sees and treats it just like a retry response it received from the target SWQ at the device. This is possible because, ENQCMD/S requests are self-contained and don't have any ordering constraints associated with them. System designs and fabrics may make use of this property to handle temporal congestion or back-pressure conditions in hardware/fabrics.

This property may also be utilized to build optimized designs where the SWQ may be moved closer to the CPU and use a dedicated posted/credit-based method to forward accepted commands to the SWQ to the target device. Such approaches may be useful to improve the round-trip latency of ENQCMD/S instruction which otherwise is required to send the non-posted write request all the way to the SWQ on device and wait for completion.

The SWQ could be implemented on a device by making use of either dedicated storage onchip (SRAM), or using extended memory (DRAM) on the device or even reserved/stolen memory in the platform. In these cases, the SWQ is just a front end for the clients to submit work using non-posted semantics, and all accepted commands to a SWQ are written to an in-memory work-queue by the device, from which the various execution of the engines can fetch work just like any normal memory-based work-queue. Such memory-backed SWQ implementation can allow for a large SWQ capacity than what may be otherwise possible with dedicated on-chip SRAM storage.

Figure 2:
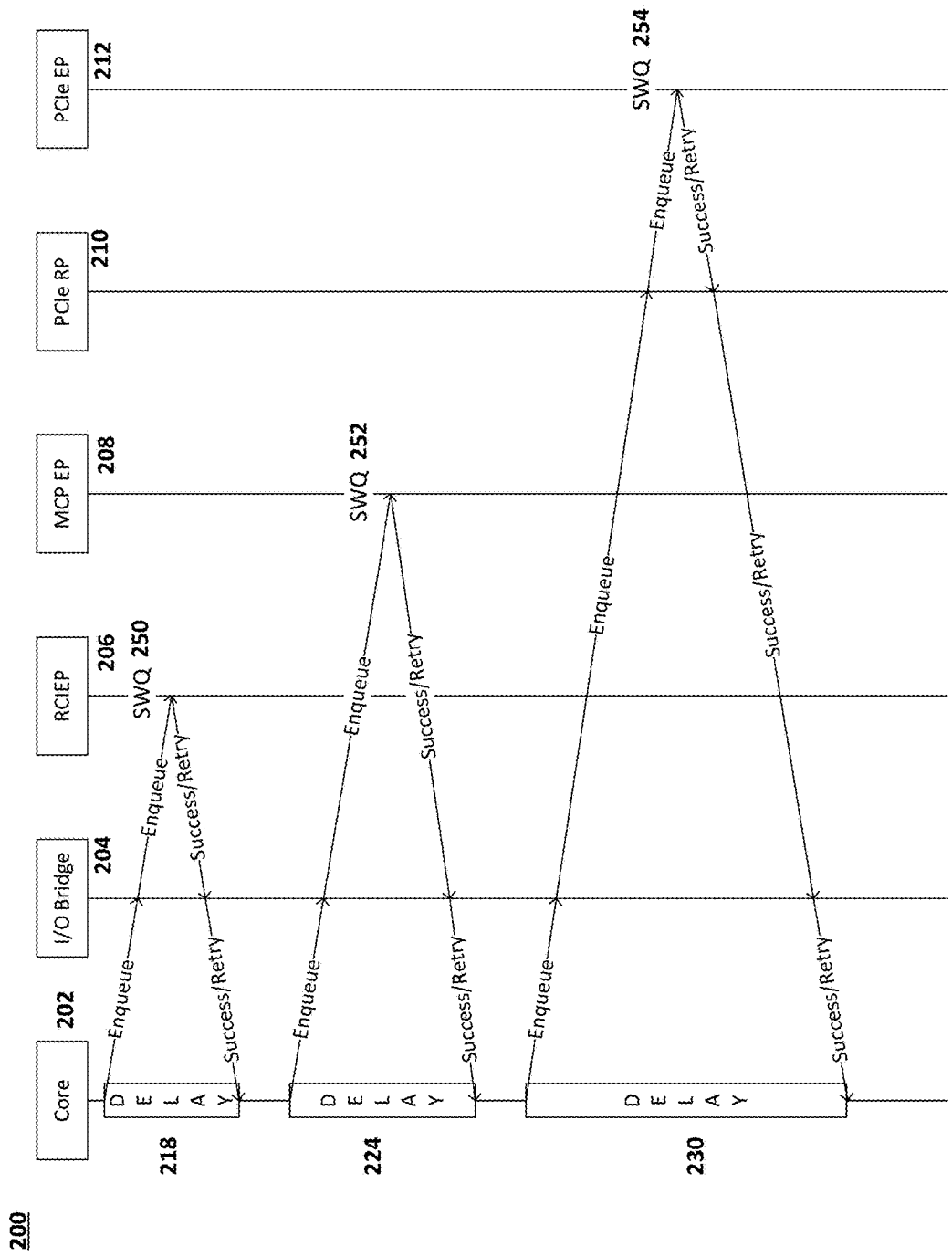
FIG. 2 illustrates delays associated with shared work queue status reporting.

One issue with the above scheme is that the client which issues the ENQCMD/S instruction needs to wait for the result of the work submission before it can continue with execution. FIG. 2 illustrates round trip timing 200 associated with shared work queue status reporting. In FIG. 2, an agent (here, represented by Core 202), can send an ENQCMD/S instruction to a device.

There are three general categories under which an I/O device can lie based on its latency from the issuing CPU:
1. Root Complex Integrated Endpoint (RCiEP) 206; RCiEP 206 can implement a SWQ 250;
2. PCIe Endpoint (MCP EP 208) located off-die but on-package as a multi-chip package; MCP EP 208 can implement a SWQ 252;
3. PCIe Endpoint (PCIe EP 212) located on the PCIe fabric, either directly connected to the root complex or below a switch hierarchy; PCIe EP 206 can implement a SWQ 254.

Although the semantics of the ENQCMD/S instruction allow for speculative execution past it, typical implementations of ENQCMD/S will always be followed by a conditional jump which can be committed only after the ENQCMD/S instruction has retired and the result of the EFLAGS.ZF (success/retry) is known. This means that the latency of the non-posted write transaction towards the I/O device is critical for performance.

Depending on the location of the accelerator and the distance from the CPU, this latency can vary quite widely and can be quite large. Depending on which of the categories the device falls under, the latency can range from 100 s of nanoseconds to potentially milliseconds. For example, for an RCiEP 206, the round trip delay can be represented by box

218. For example, for an MCP EP 208, the round trip delay can be represented by box 224, where delay 224>delay 218. For example, for an PCi EP 212, the round trip delay can be represented by box 230, where delay 230>delay 224.

Figure 3:
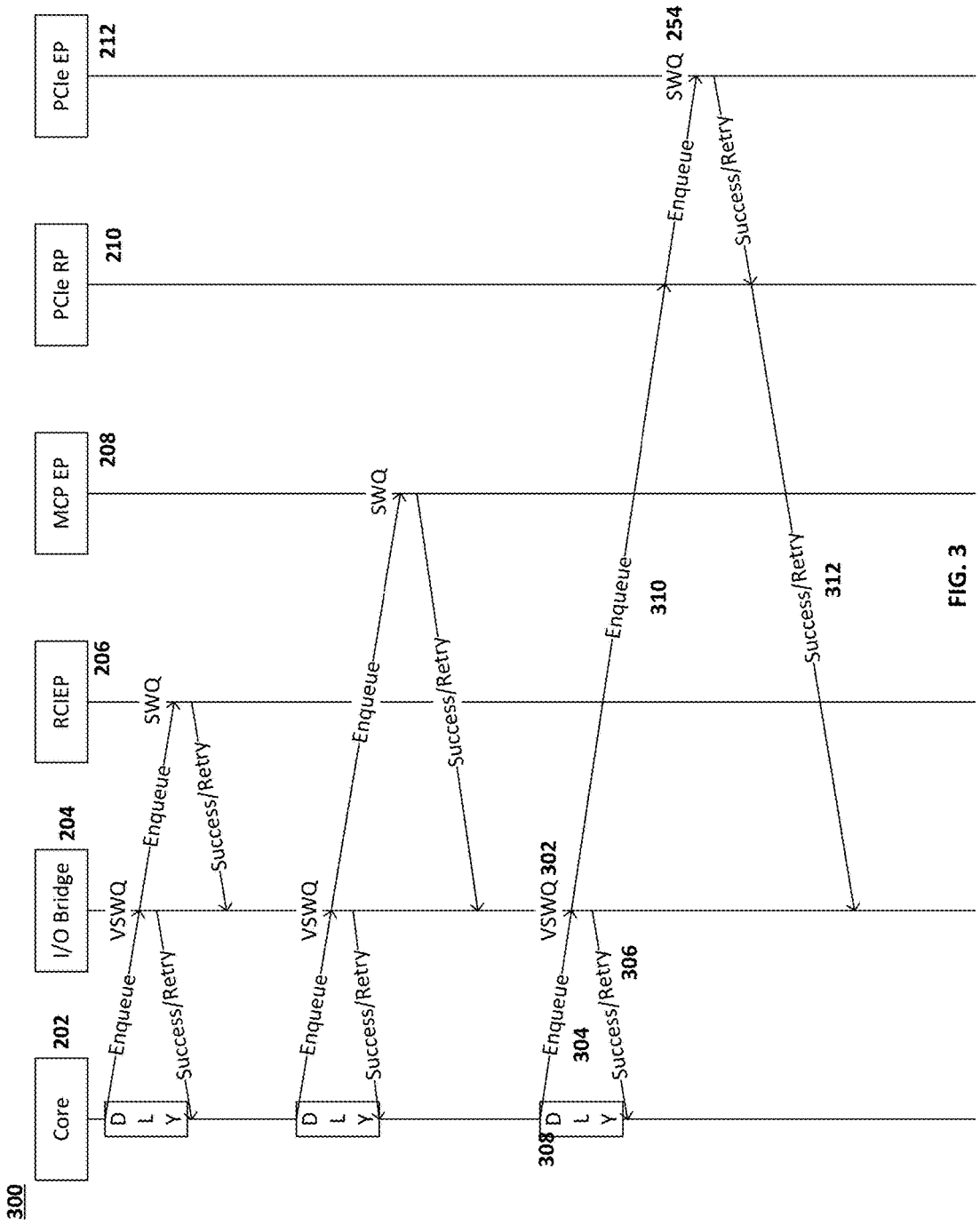
FIG. 3 illustrates delays associated with shared work queue status reporting with a virtual shared work queue in accordance with embodiments of the present disclosure.

This disclosure describes reducing the round trip latency by maintaining a Virtual Shared Work Queue (VSWQ) in the root complex, close to the CPU submitting work to a device. FIG. 3 illustrates round trip timing 300 associated with shared work queue status reporting with a virtual shared work queue in accordance with embodiments of the present disclosure. The VSWQ interacts with the actual shared work queue (SWQ) independent of the CPU work submission process and thus, makes the latency to the device transparent to the CPU.

As an example, FIG. 3 illustrates a VSWQ 302 implemented within the I/O bridge 204. Using a VSWQ 302, the latency can be made more deterministic and be reduced by an order or two of magnitude, to 10 s of nanoseconds.

The above variance and magnitude of latency can be mitigated by having a Virtual Shared Work Queue (VSWQ) 302 within the root complex close to the requesting agent (here, core 202), potentially within the I/Obridge 204 or other structure. Thus, the success/retry decision for work submission can be made by the VSWQ 302 itself, located much closer to the core resulting in a much shorter round trip latency. Although FIG. 3 shows an example of the VSWQ 302 located within the I/O bridge 204, the VSWQ 302 can potentially be located almost any place within the root complex or within the core itself, for example, within the fill buffers of the core.

The VSWQ 302 operates fundamentally differently from the actual Shared Work Queue (SWQ) 254 inside the PCIe EP 212. Whereas the SWQ 254 is implemented using dedicated storage, such as SRAM or DRAM, etc., the VSWQ 302 is implemented using a set of credit counters which tracks the availability of SWQ buffers at the target device. This allows the VSWQ 302 implementation to be much lighter weight and lower cost than the actual SWQ 254.

The number of VSWQ credit counters depends on the number of SWQ 254 that needs to be tracked. Similar to SWQ, the VSWQ 302 will be indexed by the MMIO address issued by the ENQCMD/S instruction. The mapping of VSWQ 302 to a target SWQ 254 is programmable and allows for flexibility in configurations such that a given VSWQ 302 can proxy for any of the attached SWQs. The VSWQ 302 is free to reject an ENQCMD/S request any time due to various reasons, such as fabric QoS, credit pressure etc., as long as it returns a retry status back to the software.

However, once a VSWQ 302 accepts a request, the request needs to be sent to the actual SWQ in an end-to-end credited fashion without dropping.

There is no requirement that the number of VSWQ 302 provisioned in a root complex must cover every SWQ that may be attached. The QoS policies implemented by the SWQ 254 of a device may also be emulated by the VSWQ 302 by establishing credit thresholds for privileged vs non-privileged modes of work.

A core 202 can transmit an ENQCMD/S message 304 with an MMIO address for a SWQ 254 associated with a device (here, PCIe EP 212). The ENQCMD/s message 304 is indexed to the VSWQ 302 within the I/O bridge 204. The VSWQ can provide a success/retry message 306 to the core 202. The VSWQ 302 can send the ENQCMD/S message 310 on to the SWQ 254 as-is. The SWQ 254 can then send a success/retry message 312 back to the VSWQ 302 in the I/O bridge 204 to update the credit counter.

Figure 4:
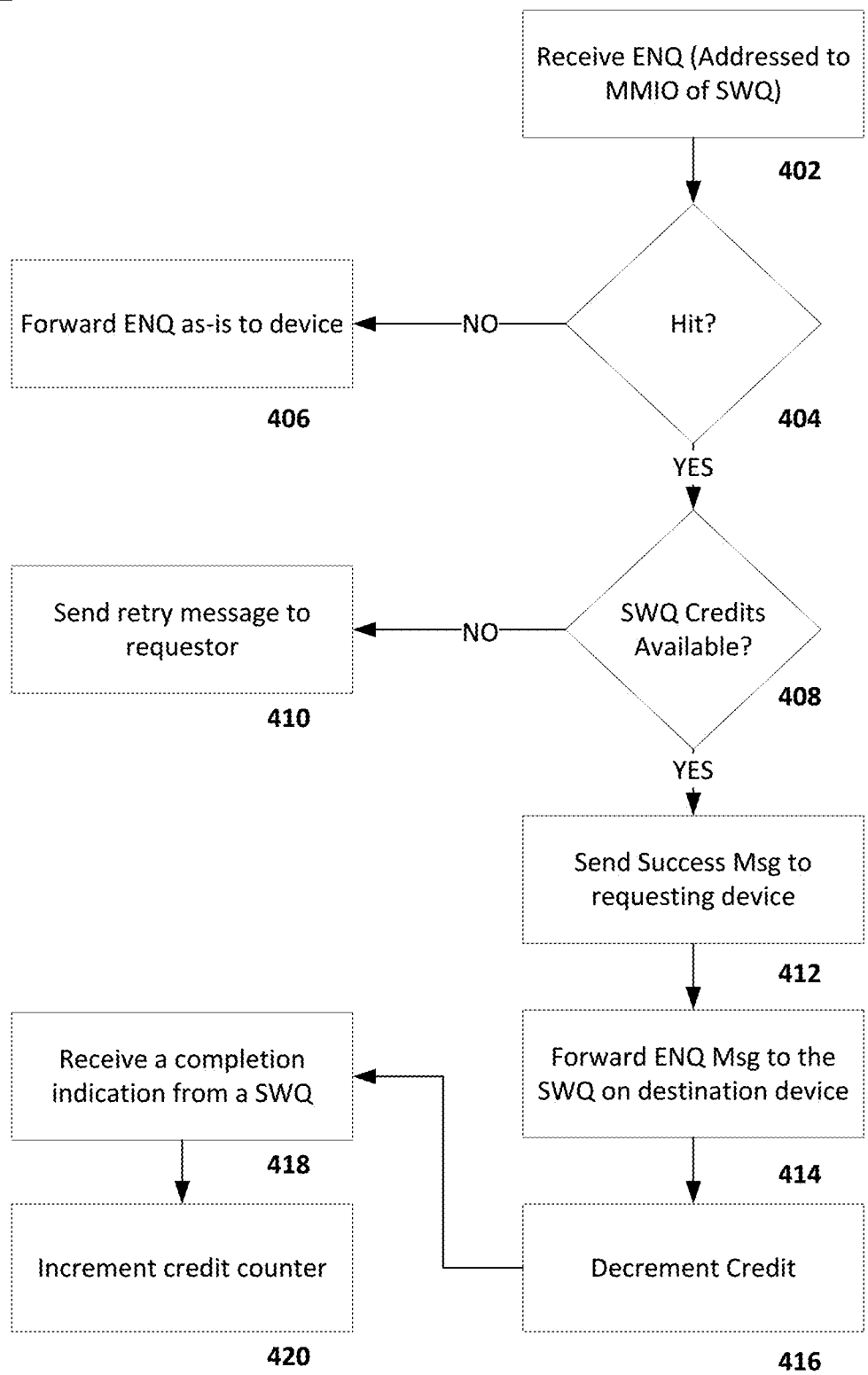
FIG. 4 is a process flow diagram for providing status information for a shared work queue from a virtual shared work queue in accordance with embodiments of the present disclosure.

FIG. 4 is a process flow diagram 400 for providing status information for a shared work queue from a virtual shared work queue (VSWQ) in accordance with embodiments of the present disclosure. The VSWQ can receive an enqueue command (ENQCMD/S) message from an agent (402). The ENQCMD/S can be indexed to the VSWQ based on a shared MMIO address associated with the shared work queue (SWQ) on a destination device. The VSWQ can determine whether the ENQCMD/S should be handled by the VSWQ (404). If there is no hit, then the VSWQ can forward the ENQCMD/S to the SWQ as is (406). If there is a hit, then the VSWQ can determine whether there are available credits for the SWQ (408). If there are no credits available, then the VSWQ can send a retry message to the requesting device (410). If there is at least one credit available in the credit counter on the VSWQ, then a success message can be sent to the requesting device (412). The VSWQ can also forward the ENQCMD/S message to the SWQ on the device (414). The VSWQ can decrement the credit counter (416).

The VSWQ can receive a completion message from the SWQ (418). The completion message can be a success message or other flag. The VSWQ can increment the credit counter (420).

Figure 5:
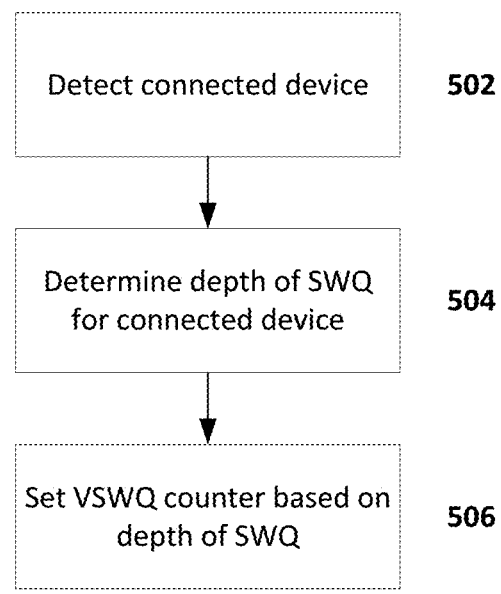
FIG. 5 is a process flow diagram for initializing a virtual shared work queue in accordance with embodiments of the present disclosure.

FIG. 5 is a process flow diagram 500 for initializing a virtual shared work queue in accordance with embodiments of the present disclosure. The bios can detect the connection of a peripheral device (502). The depth of the SWQ can be determined (504). A number of credits for the corresponding VSWQ can be set based on the depth of the SWQ (506).

One interconnect fabric architecture includes the Peripheral Component Interconnect (PCI) Express (PCIe) architecture. A primary goal of PCIe is to enable components and devices from different vendors to inter-operate in an open architecture, spanning multiple market segments; Clients (Desktops and Mobile), Servers (Standard and Enterprise), and Embedded and Communication devices. PCI Express is a high performance, general purpose I/O interconnect defined for a wide variety of future computing and communication platforms. Some PCI attributes, such as its usage model, load-store architecture, and software interfaces, have been maintained through its revisions, whereas previous parallel bus implementations have been replaced by a highly scalable, fully serial interface. The more recent versions of PCI Express take advantage of advances in point-to-point interconnects, Switch-based technology, and packetized protocol to deliver new levels of performance and features. Power Management, Quality Of Service (QoS), Hot-Plug/Hot-Swap support, Data Integrity, and Error Handling are among some of the advanced features supported by PCI Express.

Figure 6:
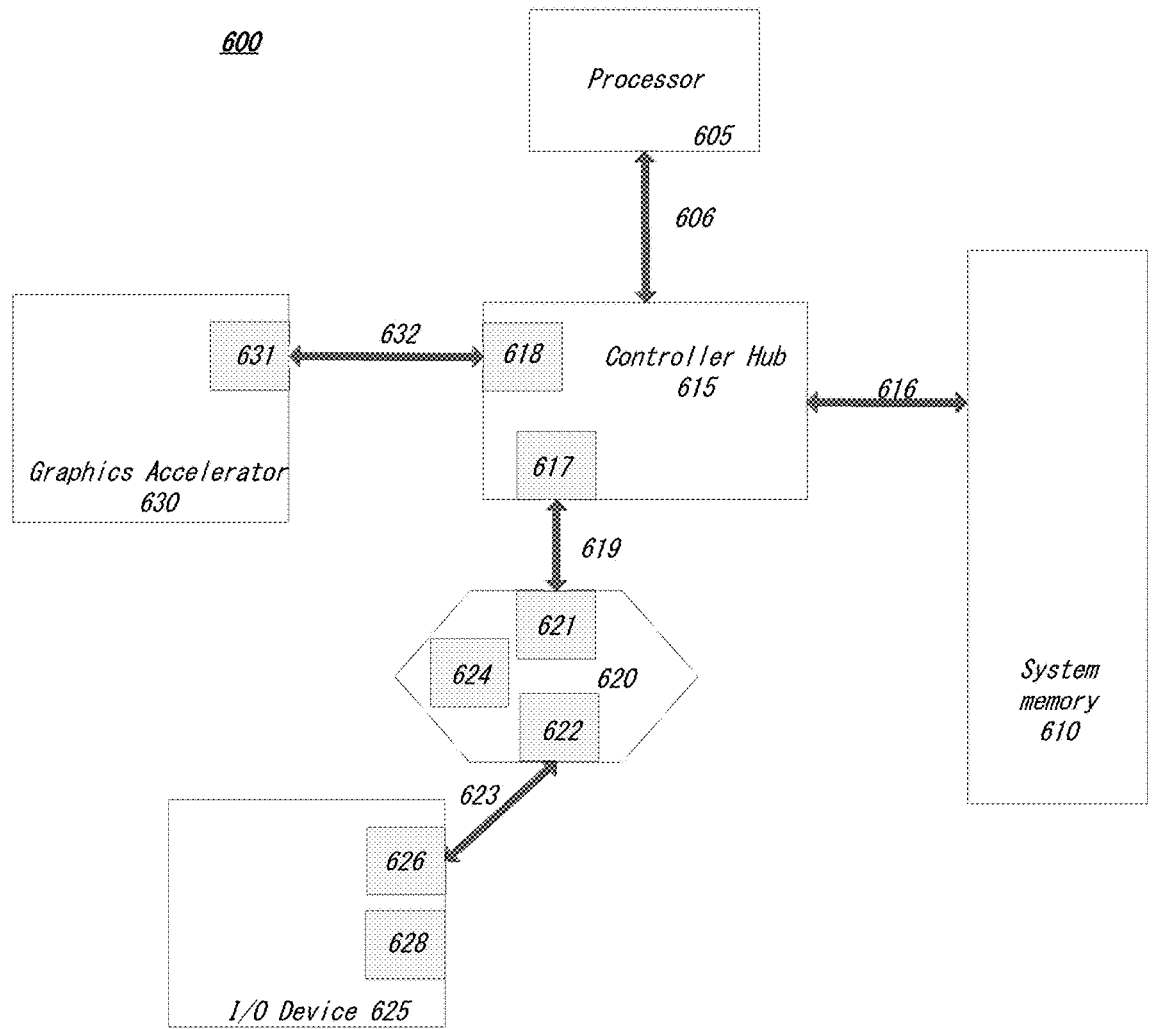
FIG. 6 illustrates an embodiment of a computing system including an interconnect architecture.

Referring to FIG. 6, an embodiment of a fabric composed of point-to-point Links that interconnect a set of components is illustrated. System 600 includes processor 605 and system memory 610 coupled to controller hub 615. Processor 605 includes any processing element, such as a microprocessor, a host processor, an embedded processor, a co-processor, or other processor. Processor 605 is coupled to controller hub 615 through front-side bus (FSB) 606. In one embodiment, FSB 606 is a serial point-to-point interconnect as described below. In another embodiment, link 606 includes a serial, differential interconnect architecture that is compliant with different interconnect standard.

System memory 610 includes any memory device, such as random access memory (RAM), non-volatile (NV) memory, or other memory accessible by devices in system 600. System memory 610 is coupled to controller hub 615 through memory interface 616. Examples of a memory interface include a double-data rate (DDR) memory interface, a dual-channel DDR memory interface, and a dynamic RAM (DRAM) memory interface.

In one embodiment, controller hub 615 is a root hub, root complex, or root controller in a Peripheral Component Interconnect Express (PCIe or PCIE) interconnection hierarchy. Examples of controller hub 615 include a chipset, a memory controller hub (MCH), a northbridge, an interconnect controller hub (ICH) a southbridge, and a root controller/hub. Often the term chipset refers to two physically separate controller hubs, i.e. a memory controller hub (MCH) coupled to an interconnect controller hub (ICH). Note that current systems often include the MCH integrated with processor 605, while controller 615 is to communicate with I/O devices, in a similar manner as described below. In some embodiments, peer-to-peer routing is optionally supported through root complex 615.

Here, controller hub 615 is coupled to switch/bridge 620 through serial link 619. Input/output modules 617 and 621, which may also be referred to as interfaces/ports 617 and 621, include/implement a layered protocol stack to provide communication between controller hub 615 and switch 620. In one embodiment, multiple devices are capable of being coupled to switch 620. In embodiments, switch/bridge 620 can include a virtual shared work queue (VSWQ) 624. VSWQ 624 can be implemented in hardware, software, or a combination of hardware and software. The VSWQ 624 can receive ENQCMD/S from the hub 615 through interface 621 and return shared work queue status information to the hub 615 through the interface 621. The VSWQ 624 can transmit the ENQCMD/S to the device 630 through interface 622 and can receive completion indicators from the device 625 through interface 622. The VSWQ 624 can also be set with a credit counter by a bios once the depth of the SWQ 628 in the device 625 is known. Device 625 in this example can include a graphics processing unit and/or accelerator that supports user-mode I/O for heterogeneous processing in a cloud environment and/or data center environment.

Switch/bridge 620 routes packets/messages from device 625 upstream, i.e. up a hierarchy towards a root complex, to controller hub 615 and downstream, i.e. down a hierarchy away from a root controller, from processor 605 or system memory 610 to device 625. Switch 620, in one embodiment, is referred to as a logical assembly of multiple virtual PCI-to-PCI bridge devices. Device 625 includes any internal or external device or component to be coupled to an electronic system, such as an I/O device, a Network Interface Controller (NIC), an add-in card, an audio processor, a network processor, a hard-drive, a storage device, a CD/DVD ROM, a monitor, a printer, a mouse, a keyboard, a router, a portable storage device, a Firewire device, a Universal Serial Bus (USB) device, a scanner, and other input/output devices. Often in the PCIe vernacular, such as device, is referred to as an endpoint. Although not specifically shown, device 625 may include a PCIe to PCI/PCI-X bridge to support legacy or other version PCI devices. Endpoint devices in PCIe are often classified as legacy, PCIe, or root complex integrated endpoints.

In embodiments, device 625 includes a shared work queue 628. Shared work queue 628 can include a hardware storage element and control software. The shared work queue 628 can transmit completion information to the VSWQ 624 of the switch/bridge 620.

Graphics accelerator 630 is also coupled to controller hub 615 through serial link 632. In one embodiment, graphics accelerator 630 is coupled to an MCH, which is coupled to an ICH. Switch 620, and accordingly I/O device 625, is then coupled to the ICH. I/O modules 631 and 618 are also to implement a layered protocol stack to communicate between graphics accelerator 630 and controller hub 615. Similar to the MCH discussion above, a graphics controller or the graphics accelerator 630 itself may be integrated in processor 605.

Figure 7:
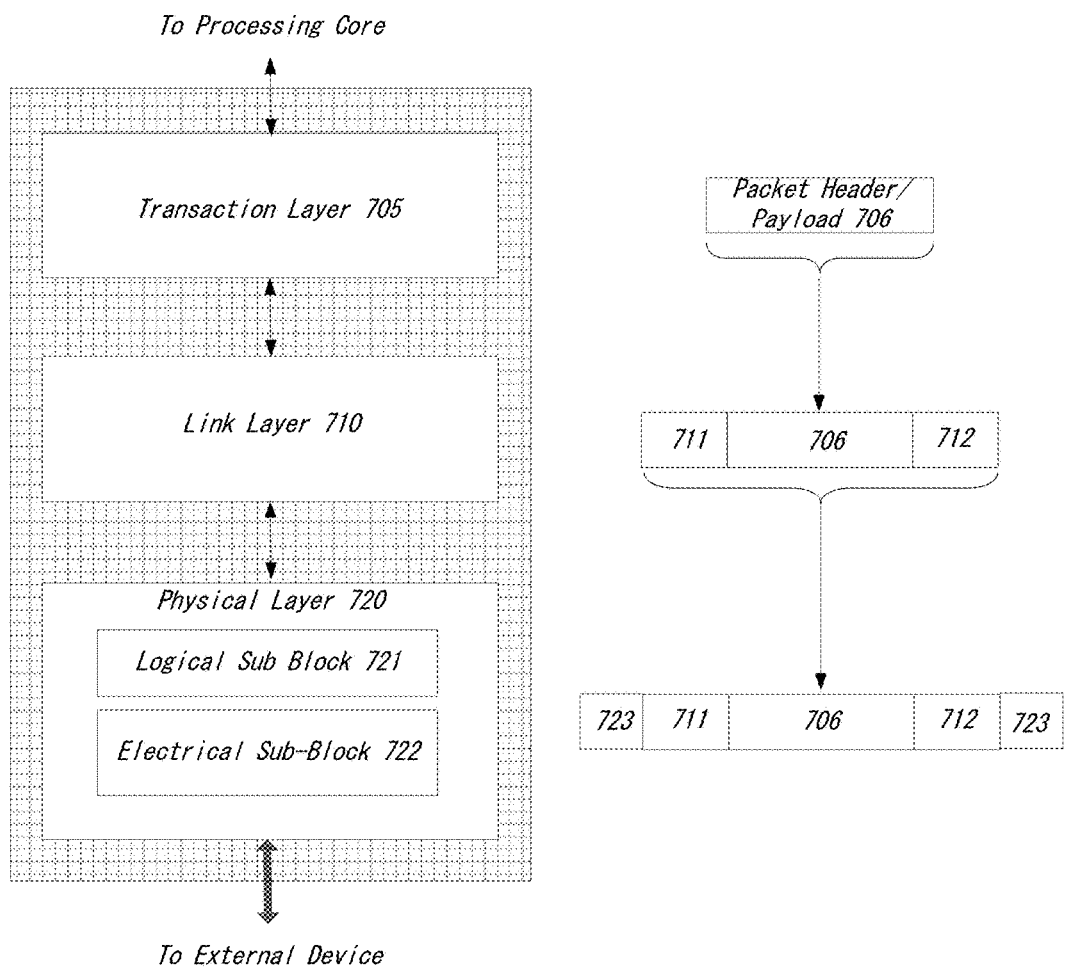
FIG. 7 illustrates an embodiment of a interconnect architecture including a layered stack.

Turning to FIG. 7 an embodiment of a layered protocol stack is illustrated. Layered protocol stack 700 includes any form of a layered communication stack, such as a Quick Path Interconnect (QPI) stack, a PCie stack, a next generation high performance computing interconnect stack, or other layered stack. Although the discussion immediately below in reference to FIGS. 6-9 are in relation to a PCIe stack, the same concepts may be applied to other interconnect stacks. In one embodiment, protocol stack 700 is a PCIe protocol stack including transaction layer 705, link layer 710, and physical layer 720. An interface, such as interfaces 617, 618, 621, 622, 626, and 631 in FIG. 1, may be represented as communication protocol stack 700. Representation as a communication protocol stack may also be referred to as a module or interface implementing/including a protocol stack.

PCI Express uses packets to communicate information between components. Packets are formed in the Transaction Layer 705 and Data Link Layer 710 to carry the information from the transmitting component to the receiving component. As the transmitted packets flow through the other layers, they are extended with additional information necessary to handle packets at those layers. At the receiving side the reverse process occurs and packets get transformed from their Physical Layer 720 representation to the Data Link Layer 710 representation and finally (for Transaction Layer Packets) to the form that can be processed by the Transaction Layer 705 of the receiving device.

Transaction Layer

In one embodiment, transaction layer 705 is to provide an interface between a device's processing core and the interconnect architecture, such as data link layer 710 and physical layer 720. In this regard, a primary responsibility of the transaction layer 705 is the assembly and disassembly of packets (i.e., transaction layer packets, or TLPs). The translation layer 705 typically manages credit-base flow control for TLPs. PCIe implements split transactions, i.e. transactions with request and response separated by time, allowing a link to carry other traffic while the target device gathers data for the response.

In addition PCIe utilizes credit-based flow control. In this scheme, a device advertises an initial amount of credit for each of the receive buffers in Transaction Layer 705. An external device at the opposite end of the link, such as controller hub 115 in FIG. 1, counts the number of credits consumed by each TLP. A transaction may be transmitted if the transaction does not exceed a credit limit. Upon receiving a response an amount of credit is restored. An advantage of a credit scheme is that the latency of credit return does not affect performance, provided that the credit limit is not encountered.

In one embodiment, four transaction address spaces include a configuration address space, a memory address space, an input/output address space, and a message address space. Memory space transactions include one or more of read requests and write requests to transfer data to/from a memory-mapped location. In one embodiment, memory space transactions are capable of using two different address formats, e.g., a short address format, such as a 32-bit address, or a long address format, such as 64-bit address. Configuration space transactions are used to access configuration space of the PCIe devices. Transactions to the configuration space include read requests and write requests. Message space transactions (or, simply messages) are defined to support in-band communication between PCIe agents.

Therefore, in one embodiment, transaction layer 705 assembles packet header/payload 706. Format for current packet headers/payloads may be found in the PCIe specification at the PCIe specification website.

Figure 8:
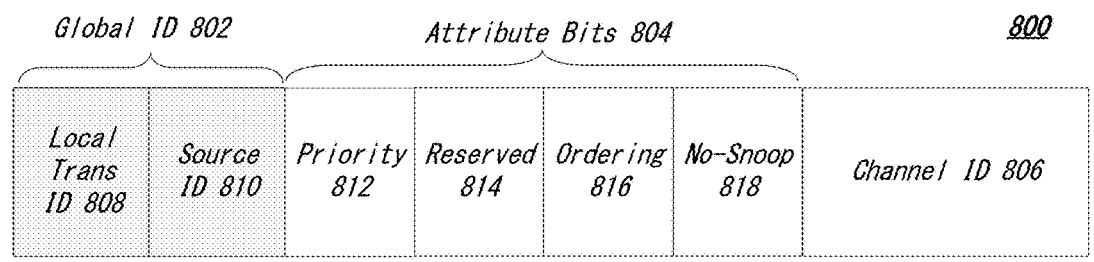
FIG. 8 illustrates an embodiment of a request or packet to be generated or received within an interconnect architecture.

Quickly referring to FIG. 8, an embodiment of a PCIe transaction descriptor is illustrated. In one embodiment, transaction descriptor 800 is a mechanism for carrying transaction information. In this regard, transaction descriptor 800 supports identification of transactions in a system. Other potential uses include tracking modifications of default transaction ordering and association of transaction with channels.

Transaction descriptor 800 includes global identifier field 802, attributes field 804 and channel identifier field 806. In the illustrated example, global identifier field 802 is depicted comprising local transaction identifier field 808 and source identifier field 810. In one embodiment, global transaction identifier 802 is unique for all outstanding requests.

According to one implementation, local transaction identifier field 808 is a field generated by a requesting agent, and it is unique for all outstanding requests that require a completion for that requesting agent. Furthermore, in this example, source identifier 810 uniquely identifies the requestor agent within a PCIe hierarchy. Accordingly, together with source ID 810, local transaction identifier 808 field provides global identification of a transaction within a hierarchy domain.

Attributes field 804 specifies characteristics and relationships of the transaction. In this regard, attributes field 804 is potentially used to provide additional information that allows modification of the default handling of transactions. In one embodiment, attributes field 804 includes priority field 812, reserved field 814, ordering field 816, and no-snoop field 818. Here, priority sub-field 812 may be modified by an initiator to assign a priority to the transaction. Reserved attribute field 814 is left reserved for future, or vendor-defined usage. Possible usage models using priority or security attributes may be implemented using the reserved attribute field.

In this example, ordering attribute field 816 is used to supply optional information conveying the type of ordering that may modify default ordering rules. According to one example implementation, an ordering attribute of "0" denotes default ordering rules are to apply, wherein an ordering attribute of "1" denotes relaxed ordering, wherein writes can pass writes in the same direction, and read completions can pass writes in the same direction. Snoop attribute field 818 is utilized to determine if transactions are snooped. As shown, channel ID Field 806 identifies a channel that a transaction is associated with.

Link Layer

Link layer 710, also referred to as data link layer 710, acts as an intermediate stage between transaction layer 705 and the physical layer 720. In one embodiment, a responsibility of the data link layer 710 is providing a reliable mechanism for exchanging Transaction Layer Packets (TLPs) between two components a link. One side of the Data Link Layer 710 accepts TLPs assembled by the Transaction Layer 705, applies packet sequence identifier 711, i.e. an identification number or packet number, calculates and applies an error detection code, i.e. CRC 712, and submits the modified TLPs to the Physical Layer 720 for transmission across a physical to an external device.

Physical Layer

In one embodiment, physical layer 720 includes logical sub block 721 and electrical sub-block 722 to physically transmit a packet to an external device. Here, logical sub-block 721 is responsible for the "digital" functions of Physical Layer 721. In this regard, the logical sub-block includes a transmit section to prepare outgoing information for transmission by physical sub-block 722, and a receiver section to identify and prepare received information before passing it to the Link Layer 710.

Physical block 722 includes a transmitter and a receiver. The transmitter is supplied by logical sub-block 721 with symbols, which the transmitter serializes and transmits onto to an external device. The receiver is supplied with serialized symbols from an external device and transforms the received signals into a bit-stream. The bit-stream is de-serialized and supplied to logical sub-block 721. In one embodiment, an 8b/10b transmission code is employed, where ten-bit symbols are transmitted/received. Here, special symbols are used to frame a packet with frames 723. In addition, in one example, the receiver also provides a symbol clock recovered from the incoming serial stream.

As stated above, although transaction layer 705, link layer 710, and physical layer 720 are discussed in reference to a specific embodiment of a PCIe protocol stack, a layered protocol stack is not so limited. In fact, any layered protocol may be included/implemented. As an example, an port/interface that is represented as a layered protocol includes: (1) a first layer to assemble packets, i.e. a transaction layer; a second layer to sequence packets, i.e. a link layer; and a third layer to transmit the packets, i.e. a physical layer. As a specific example, a common standard interface (CSI) layered protocol is utilized.

Figure 9:
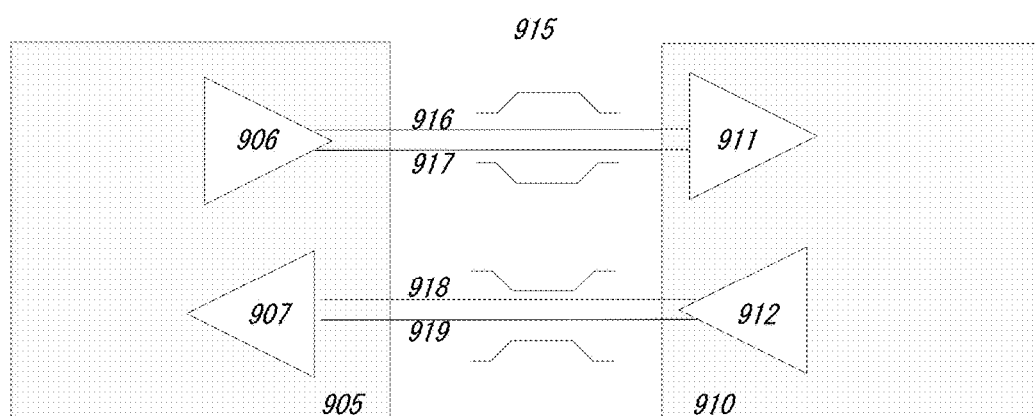
FIG. 9 illustrates an embodiment of a transmitter and receiver pair for an interconnect architecture.

Referring next to FIG. 9, an embodiment of a PCIe serial point to point fabric is illustrated. Although an embodiment of a PCIe serial point-to-point link is illustrated, a serial point-to-point link is not so limited, as it includes any transmission path for transmitting serial data. In the embodiment shown, a basic PCIe link includes two, low-voltage, differentially driven signal pairs: a transmit pair 906/911 and a receive pair 912/907. Accordingly, device 905 includes transmission logic 906 to transmit data to device 910 and receiving logic 907 to receive data from device 910. In other words, two transmitting paths, i.e. paths 916 and 917, and two receiving paths, i.e. paths 918 and 919, are included in a PCIe link.

A transmission path refers to any path for transmitting data, such as a transmission line, a copper line, an optical line, a wireless communication channel, an infrared communication link, or other communication path. A connection between two devices, such as device 905 and device 910, is referred to as a link, such as link 415. A link may support one lane—each lane representing a set of differential signal pairs (one pair for transmission, one pair for reception). To scale bandwidth, a link may aggregate multiple lanes denoted by xN, where N is any supported Link width, such as 1, 2, 4, 8, 12, 16, 32, 64, or wider.

A differential pair refers to two transmission paths, such as lines 416 and 417, to transmit differential signals. As an example, when line 416 toggles from a low voltage level to a high voltage level, i.e. a rising edge, line 417 drives from a high logic level to a low logic level, i.e. a falling edge. Differential signals potentially demonstrate better electrical characteristics, such as better signal integrity, i.e. crosscoupling, voltage overshoot/undershoot, ringing, etc. This allows for better timing window, which enables faster transmission frequencies.

Note that the apparatus', methods', and systems described above may be implemented in any electronic device or system as aforementioned. As specific illustrations, the figures below provide exemplary systems for utilizing the disclosure as described herein. As the systems below are described in more detail, a number of different interconnects are disclosed, described, and revisited from the discussion above. And as is readily apparent, the advances described above may be applied to any of those interconnects, fabrics, or architectures.

Figure 10:
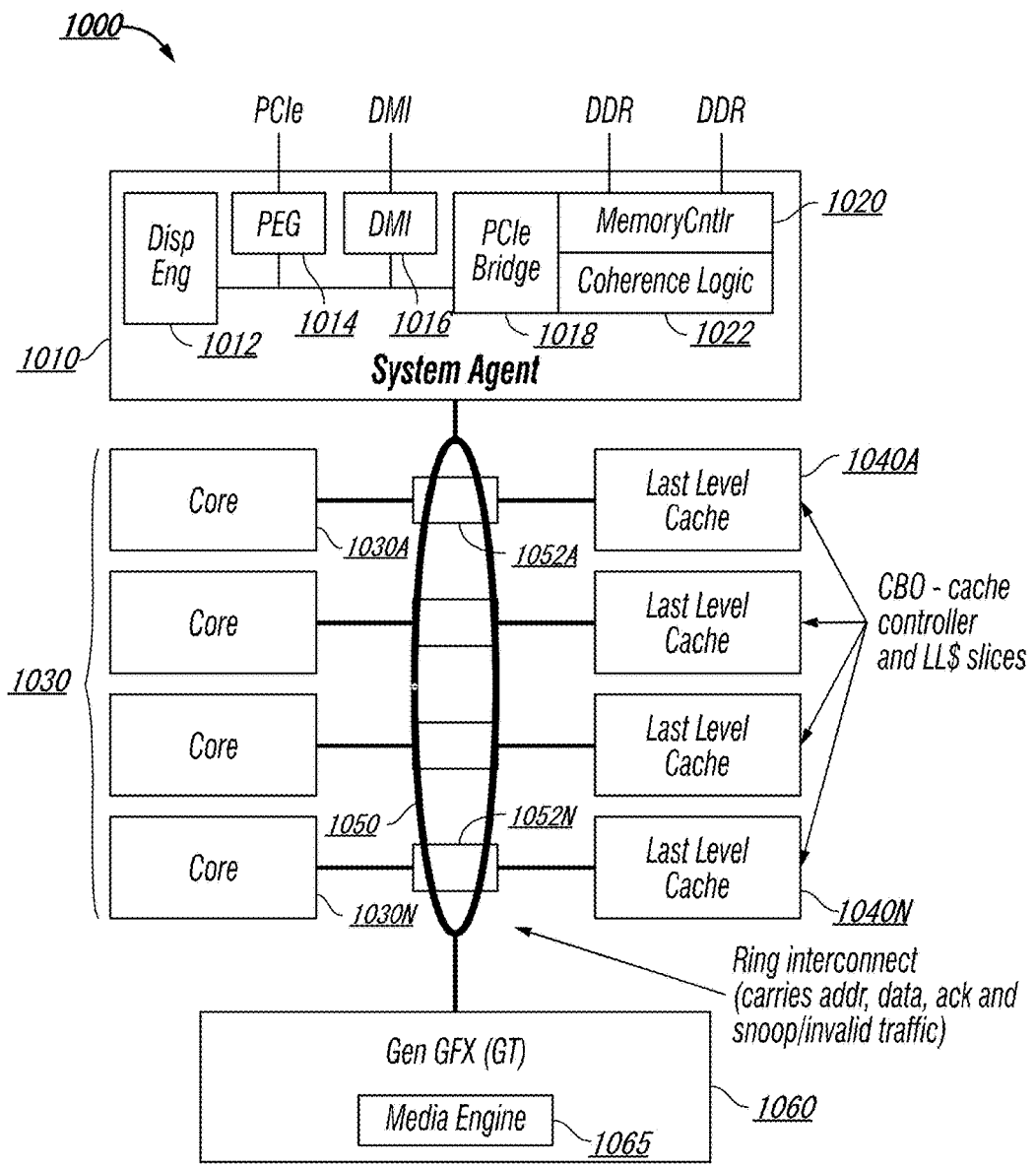
FIG. 10 illustrates a block diagram of an embodiment of a multicore processor.

Referring now to FIG. 10, shown is a block diagram of an embodiment of a multicore processor. As shown in the embodiment of FIG. 10, processor 1000 includes multiple domains. Specifically, a core domain 1030 includes a plurality of cores 1030A-1030N, a graphics domain 1060 includes one or more graphics engines having a media engine 1065, and a system agent domain 1010.

In various embodiments, system agent domain 1010 handles power control events and power management, such that individual units of domains 1030 and 1060 (e.g. cores and/or graphics engines) are independently controllable to dynamically operate at an appropriate power mode/level (e.g. active, turbo, sleep, hibernate, deep sleep, or other Advanced Configuration Power Interface like state) in light of the activity (or inactivity) occurring in the given unit. Each of domains 1030 and 1060 may operate at different voltage and/or power, and furthermore the individual units within the domains each potentially operate at an independent frequency and voltage. Note that while only shown with three domains, understand the scope of the present disclosure is not limited in this regard and additional domains may be present in other embodiments.

As shown, each core 1030 further includes low level caches in addition to various execution units and additional processing elements. Here, the various cores are coupled to each other and to a shared cache memory that is formed of a plurality of units or slices of a last level cache (LLC) 1040A-1040N; these LLCs often include storage and cache controller functionality and are shared amongst the cores, as well as potentially among the graphics engine too.

As seen, a ring interconnect 1050 couples the cores together, and provides interconnection between the core domain 1030, graphics domain 1060 and system agent circuitry 1010, via a plurality of ring stops 1052A-1052N, each at a coupling between a core and LLC slice. As seen in FIG. 10, interconnect 1050 is used to carry various information, including address information, data information, acknowledgement information, and snoop/invalid information. Although a ring interconnect is illustrated, any known on-die interconnect or fabric may be utilized. As an illustrative example, some of the fabrics discussed above (e.g. another on-die interconnect, Intel On-chip System Fabric (IOSF), an Advanced Microcontroller Bus Architecture (AMBA) interconnect, a multi-dimensional mesh fabric, or other known interconnect architecture) may be utilized in a similar fashion.

As further depicted, system agent domain 1010 includes display engine 1012 which is to provide control of and an interface to an associated display. System agent domain 1010 may include other units, such as: an integrated memory controller 1020 that provides for an interface to a system memory (e.g., a DRAM implemented with multiple DIMMs; coherence logic 1022 to perform memory coherence operations. Multiple interfaces may be present to enable interconnection between the processor and other circuitry. For example, in one embodiment at least one direct media interface (DMI) 1016 interface is provided as well as one or more PCIe™ interfaces 1014. The display engine and these interfaces typically couple to memory via a PCIe™ bridge 1018. Still further, to provide for communications between other agents, such as additional processors or other circuitry, one or more other interfaces (e.g. an Intel® Quick Path Interconnect (QPI) fabric) may be provided.

While the present disclosure has been described with respect to a limited number of embodiments, those skilled in the art will appreciate numerous modifications and variations therefrom. It is intended that the appended claims cover all such modifications and variations as fall within the true spirit and scope of this present disclosure.

A design may go through various stages, from creation to simulation to fabrication. Data representing a design may represent the design in a number of manners. First, as is useful in simulations, the hardware may be represented using a hardware description language or another functional description language. Additionally, a circuit level model with logic and/or transistor gates may be produced at some stages of the design process. Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. In any representation of the design, the data may be stored in any form of a machine readable medium. A memory or a magnetic or optical storage such as a disc may be the machine readable medium to store information transmitted via optical or electrical wave modulated or otherwise generated to transmit such information. When an electrical carrier wave indicating or carrying the code or design is transmitted, to the extent that copying, buffering, or re-transmission of the electrical signal is performed, a new copy is made. Thus, a communication provider or a network provider may store on a tangible, machine-readable medium, at least temporarily, an article, such as information encoded into a carrier wave, embodying techniques of embodiments of the present disclosure.

A module as used herein refers to any combination of hardware, software, and/or firmware. As an example, a module includes hardware, such as a micro-controller, associated with a non-transitory medium to store code adapted to be executed by the micro-controller. Therefore, reference to a module, in one embodiment, refers to the hardware, which is specifically configured to recognize and/or execute the code to be held on a non-transitory medium. Furthermore, in another embodiment, use of a module refers to the non-transitory medium including the code, which is specifically adapted to be executed by the microcontroller to perform predetermined operations. And as can be inferred, in yet another embodiment, the term module (in this example) may refer to the combination of the microcontroller and the non-transitory medium. Often module boundaries that are illustrated as separate commonly vary and potentially overlap. For example, a first and a second module may share hardware, software, firmware, or a combination thereof, while potentially retaining some independent hardware, software, or firmware. In one embodiment, use of the term logic includes hardware, such as transistors, registers, or other hardware, such as programmable logic devices.

Use of the phrase 'to' or 'configured to,' in one embodiment, refers to arranging, putting together, manufacturing, offering to sell, importing and/or designing an apparatus, hardware, logic, or element to perform a designated or determined task. In this example, an apparatus or element thereof that is not operating is still 'configured to' perform a designated task if it is designed, coupled, and/or interconnected to perform said designated task. As a purely illustrative example, a logic gate may provide a 0 or a 1 during operation. But a logic gate 'configured to' provide an enable signal to a clock does not include every potential logic gate that may provide a 1 or 0. Instead, the logic gate is one coupled in some manner that during operation the 1 or 0 output is to enable the clock. Note once again that use of the term 'configured to' does not require operation, but instead focus on the latent state of an apparatus, hardware, and/or element, where in the latent state the apparatus, hardware, and/or element is designed to perform a particular task when the apparatus, hardware, and/or element is operating.

Furthermore, use of the phrases 'capable of/to,' and or 'operable to,' in one embodiment, refers to some apparatus, logic, hardware, and/or element designed in such a way to enable use of the apparatus, logic, hardware, and/or element in a specified manner. Note as above that use of to, capable to, or operable to, in one embodiment, refers to the latent state of an apparatus, logic, hardware, and/or element, where the apparatus, logic, hardware, and/or element is not operating but is designed in such a manner to enable use of an apparatus in a specified manner.

A value, as used herein, includes any known representation of a number, a state, a logical state, or a binary logical state. Often, the use of logic levels, logic values, or logical values is also referred to as 1's and 0's, which simply represents binary logic states. For example, a 1 refers to a high logic level and 0 refers to a low logic level. In one embodiment, a storage cell, such as a transistor or flash cell, may be capable of holding a single logical value or multiple logical values. However, other representations of values in computer systems have been used. For example the decimal number ten may also be represented as a binary value of 1010 and a hexadecimal letter A. Therefore, a value includes any representation of information capable of being held in a computer system.

Moreover, states may be represented by values or portions of values. As an example, a first value, such as a logical one, may represent a default or initial state, while a second value, such as a logical zero, may represent a non-default state. In addition, the terms reset and set, in one embodiment, refer to a default and an updated value or state, respectively. For example, a default value potentially includes a high logical value, i.e. reset, while an updated value potentially includes a low logical value, i.e. set. Note that any combination of values may be utilized to represent any number of states.

The embodiments of methods, hardware, software, firmware or code set forth above may be implemented via instructions or code stored on a machine-accessible, machine readable, computer accessible, or computer readable medium which are executable by a processing element. A non-transitory machine-accessible/readable medium includes any mechanism that provides (i.e., stores and/or transmits) information in a form readable by a machine, such as a computer or electronic system. For example, a non-transitory machine-accessible medium includes random-access memory (RAM), such as static RAM (SRAM) or dynamic RAM (DRAM); ROM; magnetic or optical storage medium; flash memory devices; electrical storage devices; optical storage devices; acoustical storage devices; other form of storage devices for holding information received from transitory (propagated) signals (e.g., carrier waves, infrared signals, digital signals); etc, which are to be distinguished from the non-transitory mediums that may receive information there from.

Instructions used to program logic to perform embodiments of the disclosure may be stored within a memory in the system, such as DRAM, cache, flash memory, or other storage. Furthermore, the instructions can be distributed via a network or by way of other computer readable media. Thus a machine-readable medium may include any mechanism for storing or transmitting information in a form readable by a machine (e.g., a computer), but is not limited to, floppy diskettes, optical disks, Compact Disc, Read-Only Memory (CD-ROMs), and magneto-optical disks, Read-Only Memory (ROMs), Random Access Memory (RAM), Erasable Programmable Read-Only Memory (EPROM), Electrically Erasable Programmable Read-Only Memory (EEPROM), magnetic or optical cards, flash memory, or a tangible, machine-readable storage used in the transmission of information over the Internet via electrical, optical, acoustical or other forms of propagated signals (e.g., carrier waves, infrared signals, digital signals, etc.). Accordingly, the computer-readable medium includes any type of tangible machine-readable medium suitable for storing or transmitting electronic instructions or information in a form readable by a machine (e.g., a computer)

Reference throughout this specification to "one embodiment" or "an embodiment" means that a particular feature, structure, or characteristic described in connection with the embodiment is included in at least one embodiment of the present disclosure. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

In the foregoing specification, a detailed description has been given with reference to specific exemplary embodiments. It will, however, be evident that various modifications and changes may be made thereto without departing from the broader spirit and scope of the disclosure as set forth in the appended claims. The specification and drawings are, accordingly, to be regarded in an illustrative sense rather than a restrictive sense. Furthermore, the foregoing use of embodiment and other exemplarily language does not necessarily refer to the same embodiment or the same example, but may refer to different and distinct embodiments, as well as potentially the same embodiment.

The following paragraphs provide examples of various ones of the embodiments disclosed herein.

Example 1 is a method performed by a virtual shared work queue. The method includes receiving an enqueue command destined for a shared work queue of a peripheral device; determining a value of a credit counter for the shared work queue, wherein a credit of the credit counter represents an availability of the shared work queue to accept the enqueue command; and responding to the enqueue command based on the value of the credit counter.

Example 2 may include the subject matter of example 1, and can also include determining a capacity of the shared work queue; and initializing the credit counter with a number of credits based, at least in part, on the capacity of the shared work queue.

Example 3 may include the subject matter of any of examples 1 or 2, wherein determining the value of the credit counter comprises determining that the credit counter comprises at least one credit; and wherein responding to the enqueue command comprises providing a success message to a core processor that the shared work queue can accept the enqueue command.

Example 4 may include the subject matter of example 3, and also include forwarding the enqueue command to the shared work queue.

Example 5 may include the subject matter of example 3, and also include decrementing the at least one credit.

Example 6 may include the subject matter of any of examples 1-5, wherein determining the value of the credit counter comprises determining that the credit counter comprises zero credits; and wherein responding to the enqueue command comprises responding to the enqueue command with a retry flag.

Example 7 may include the subject matter of any of examples 1-6, and can also include receiving a completion message from the shared work queue; and incrementing the credit counter.

Example 8 is at least one machine accessible storage medium having code stored thereon, the code when executed on a machine, causes the machine to receive a work submission destined for a peripheral device; determine a value of a credit counter representing a capacity of a shared work queue for the peripheral device; and respond to the request based on the value of the credit counter.

Example 9 may include the subject matter of example 8, wherein the work submission comprises an enqueue command and a memory mapped input/output (MMIO) address of the shared work queue.

Example 10 may include the subject matter of any of examples 8 or 9, and can also include code that when executed causes the machine to determine a capacity of the shared work queue; and initialize the credit counter with a number of credits based, at least in part, on the capacity of the shared work queue.

Example 11 may include the subject matter of any of examples 8-10, and can also include code that when executed causes the machine to determine that the credit counter comprises at least one credit; and provide a success message to a core processor that the shared work queue can accept the request.

Example 12 may include the subject matter of example 11, and can also include code that when executed causes the machine to, forward the enqueue command to the shared work queue.

Example 13 may include the subject matter of example 11, and can also include code that when executed causes the machine to decrement the at least one credit.

Example 14 may include the subject matter of any of examples 8-13, and can also include code that when executed causes the machine to determine that the shared work queue does not have at least one credit; and respond to the enqueue command with a retry flag.

Example 15 may include the subject matter of any of examples 8-14, and can also include code that when executed causes the machine to increment the credit counter upon receiving a success or retry message from the shared work queue.

Example 16 is a system that includes a data link comprising a plurality of lanes, the data link compliant with a peripheral component interconnect express (PCIe) protocol; a peripheral device; and a root complex communicatively coupled to the peripheral device using the data link. The root complex can include logic to receive an enqueue command with a work submission destined for a peripheral device, the request comprising an enqueue command; determine an availability of the shared work queue to process the enqueue command based, at least in part, on a value of a credit counter associated with the shared work queue; and respond to the enqueue command based on the availability of the shared work queue.

Example 17 may include the subject matter of example 16, the root complex including logic to determine a capacity of the shared work queue; and initialize a credit counter associated with the shared work queue with a number of credits based, at least in part, on the capacity of the shared work queue.

Example 18 may include the subject matter of any of examples 16 or 17, the root complex including logic to determine that a credit counter for the shared work queue comprises at least one credit; and provide a success message to a core processor that the shared work queue can accept the enqueue command.

Example 19 may include the subject matter of example 18, the root complex including logic to forward the enqueue command to the shared work queue, the shared work queue configured to execute a write transaction to the peripheral device to process the work submission.

Example 20 may include the subject matter of example 18, the root complex including logic to decrement the at least one credit.

Example 21 may include the subject matter of any of examples 16-20, the root complex including logic to determine that the credit counter does not have at least one credit; and respond to the enqueue command with a retry flag.

Example 22 may include the subject matter of any of examples 16-21, the root complex including logic to receive a completion message from the shared work queue; and increment the credit counter.

Example 23 may include the subject matter of any of examples 16-22, wherein the peripheral device includes the shared work queue, the shared work queue providing a command interface in the peripheral device accessible by software clients utilizing the root complex.

Example 24 may include the subject matter of any of examples 16-23, wherein the root complex includes an input/output bridge, the input/output bridge comprising logic to determine an availability of the shared work queue to process the enqueue command based, at least in part, on a value of a credit counter associated with the shared work queue; and respond to the enqueue command based on the availability of the shared work queue.

What is claimed is:

1. A method performed by a virtual shared work queue, the method comprising:
    receiving, at the virtual shared work queue maintained by an input/output (I/O) bridge, an enqueue command from a core processor and destined for a shared work queue of a peripheral device, the enqueue command comprising a work submission destined for the peripheral device coupled to the I/O bridge;
    determining a value of a credit counter for the shared work queue, wherein a credit of the credit counter represents an availability of the shared work queue to accept the enqueue command, the credit counter maintained by the virtual shared work queue; and
    responding, from the virtual shared work queue I/O bridge, to the enqueue command based on the value of the credit counter with one of a success flag indicating a successful enqueue command to the shared work queue or a retry flag indicating an unsuccessful enqueue command to the shared work queue;

wherein:
  determining the value of the credit counter comprises determining that the credit counter comprises at least one credit,
  responding to the enqueue command comprises providing a success message to a processor core that the shared work queue accepts the enqueue command;
the method further comprising:
  decrementing the at least one credit;
  receiving a completion message from the shared work queue; and
  incrementing the credit counter.

2. The method of claim 1, further comprising:
  determining a capacity of the shared work queue; and
  initializing the credit counter with a number of credits based, at least in part, on the capacity of the shared work queue.

3. The method of claim 1, further comprising forwarding the enqueue command to the shared work queue.

4. The method of claim 1, wherein determining the value of the credit counter comprises determining that the credit counter comprises zero credits; and wherein:
  responding to the enqueue command comprises responding to the enqueue command with a retry indication.

5. At least one non-transitory machine accessible storage medium having code stored thereon, the code when executed on a machine, causes the machine to:
  receive, from a core processor coupled to the I/O bridge and by a virtual shared work queue at an input/output (I/O) bridge, a work submission destined for a peripheral device coupled to the I/O bridge;
  determine a value of a credit counter representing a capacity of a shared work queue for the peripheral device, the credit counter maintained by the virtual shared work queue; and
  respond to the request based on the value of the credit counter, with one of a success flag indicating a successful enqueue command to the shared work queue or a retry flag indicating an unsuccessful enqueue command to the shared work queue;
the code when executed to cause the machine to:
  determine that the credit counter comprises at least one credit;
  provide a success message to a core processor that the shared work queue can accept the request;
  decrement the at least one credit; and
  increment the credit counter upon receiving a success or retry message from the shared work queue.

6. The at least one machine accessible storage medium of claim 5, wherein the work submission comprises an enqueue command and a memory mapped input/output (MMIO) address of the shared work queue.

7. The at least one machine accessible storage medium of claim 5, further comprising code that when executed causes the machine to determine a capacity of the shared work queue; and initialize the credit counter with a number of credits based, at least in part, on the capacity of the shared work queue.

8. The at least one machine accessible storage medium of claim 5, further comprising code that when executed causes the machine to, forward the enqueue command to the shared work queue.

9. The at least one machine accessible storage medium of claim 5, further comprising code that when executed causes the machine to determine that the shared work queue does not have at least one credit; and respond to the enqueue command with a retry flag.

10. A system comprising:
  a data link comprising a plurality of lanes;
  a peripheral device; and
  a root complex communicatively coupled to the peripheral device using the data link, the root complex comprising logic implemented at least partially in hardware to:
    receive, at the virtual shared work queue maintained by an input/output (I/O) bridge, an enqueue command from a core processor and with a work submission destined for the peripheral device coupled to the I/O bridge, the request comprising an enqueue command;
    determine an availability of the shared work queue to process the enqueue command based, at least in part, on a value of a credit counter associated with the shared work queue, the credit counter maintained by the virtual shared work queue; and
    respond, from the virtual shared work queue I/O bridge, to the enqueue command based on the availability of the shared work queue with one of a success flag indicating a successful enqueue command to the shared work queue or a retry flag indicating an unsuccessful enqueue command to the shared work queue;
  the root complex comprising logic to:
    determine that a credit counter for the shared work queue comprises at least one credit; and
    provide a success message to a core processor that the shared work queue can accept the enqueue command;
    decrement the at least one credit; and
    receive a completion message from the shared work queue; and
    increment the credit counter.

11. The system of claim 10, the root complex comprising logic to determine a capacity of the shared work queue; and initialize a credit counter associated with the shared work queue with a number of credits based, at least in part, on the capacity of the shared work queue.

12. The system of claim 10, the root complex comprising logic to forward the enqueue command to the shared work queue, the shared work queue configured to execute a write transaction to the peripheral device to process the work submission.

13. The system of claim 10, the root complex comprising logic to determine that the credit counter does not have at least one credit; and respond to the enqueue command with a retry flag.

14. The system of claim 10, wherein the peripheral device comprises the shared work queue, the shared work queue providing a command interface in the peripheral device accessible by software clients utilizing the root complex.

15. The system of claim 10, wherein the root complex comprises an input/output bridge, the input/output bridge comprising logic to determine an availability of the shared work queue to process the enqueue command based, at least in part, on a value of a credit counter associated with the shared work queue; and respond to the enqueue command based on the availability of the shared work queue.

16. The system of claim 10, wherein the peripheral device comprises an accelerator.

* * * * *